Aug. 28, 1951     A. R. TRIST     2,566,002
BEARING FOR ROTATING SHAFTS
Filed Feb. 15, 1949                                        2 Sheets-Sheet 1
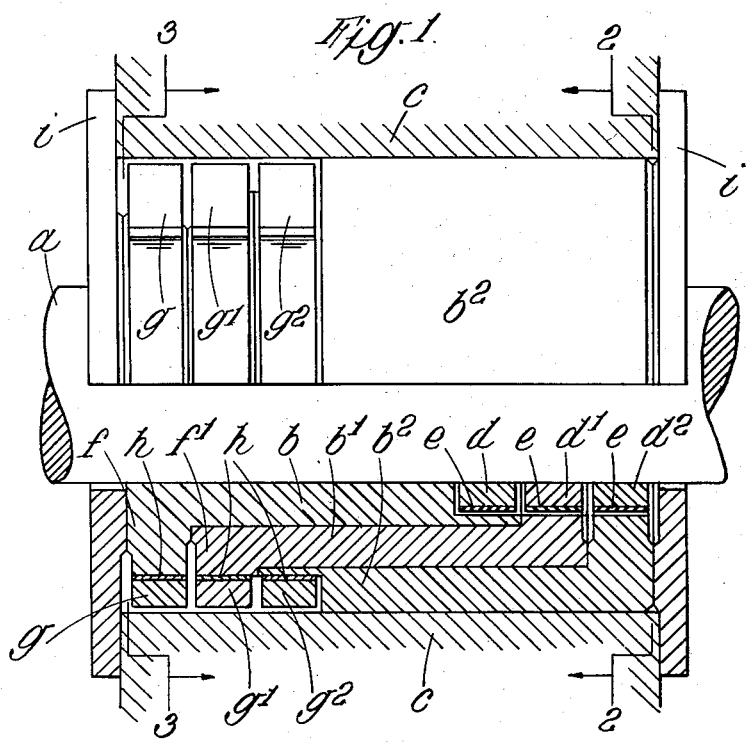
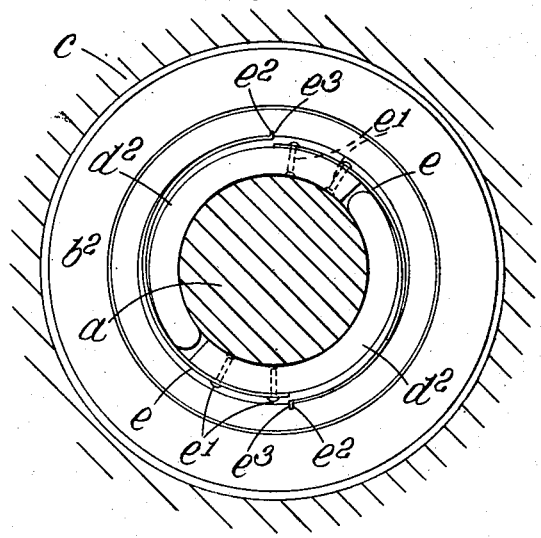
Inventor
ARTHUR RONALD TRIST
By Richardson and David
Attorneys

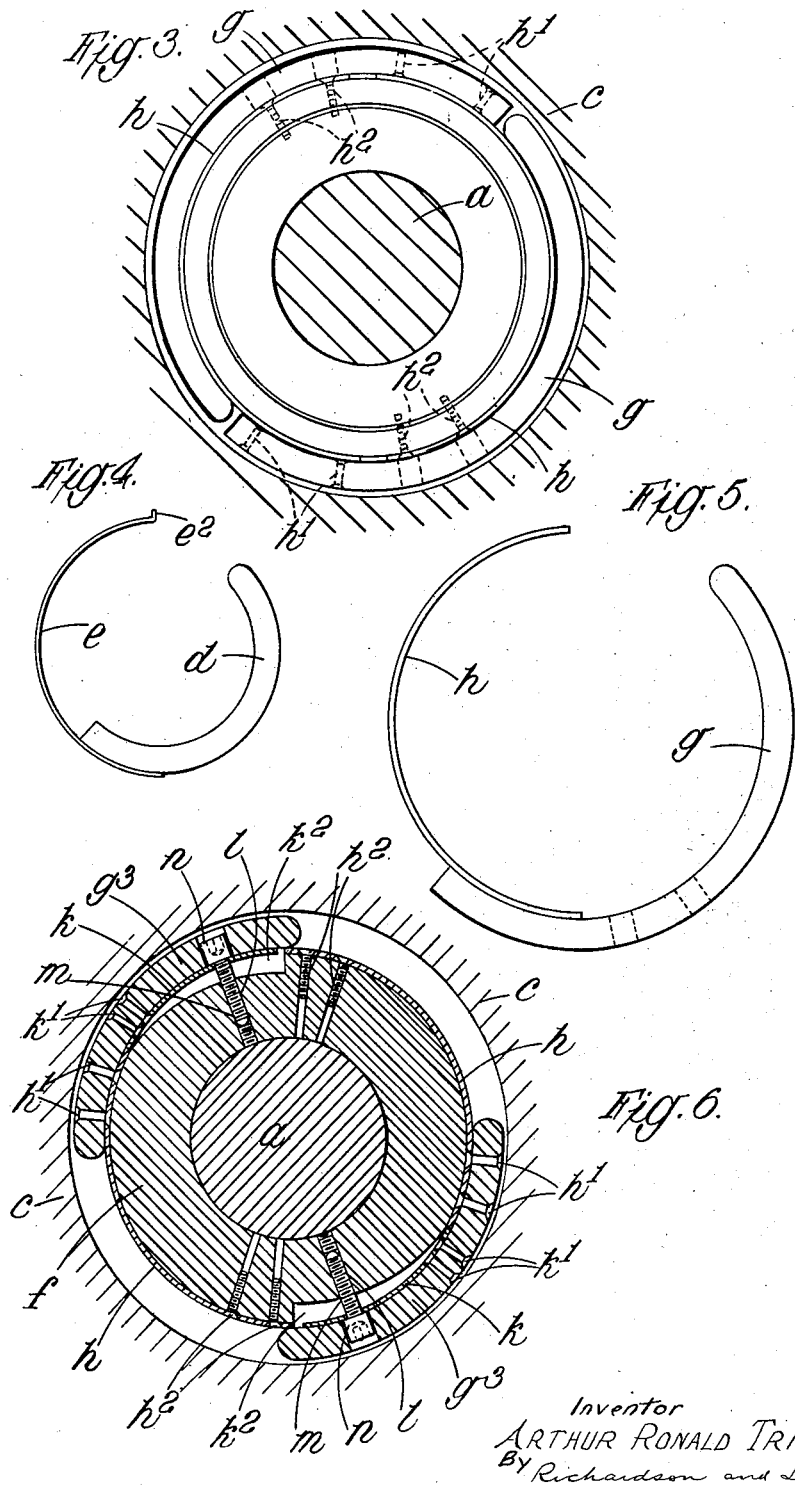

Patented Aug. 28, 1951

2,566,002

UNITED STATES PATENT OFFICE 2,566,002

BEARING FOR ROTATING SHAFTS

Arthur Ronald Trist, St. Catherines, Ontario, Canada

Application February 15, 1949, Serial No. 76,581
In Great Britain September 13, 1948

6 Claims. (Cl. 308—37)

This invention relates to improvements in bearings for rotating shafts and has for its object to reduce the frictional loss in such bearings by simple and comparatively inexpensive means of a reliable character.

When commercial machines and engines operate at comparatively high speeds, for example about three thousand revolutions per minute it is found that the co-efficient of friction between the sliding surfaces of the journal is unnecessarily high because the speed necessitates a comparatively thin lubricant ill adapted for a load and this invention provides for a considerable reduction in the relative speeds of the surfaces in sliding contact to enable more viscous lubricant to be used.

This invention consists in a bearing for rotating shafts and is characterised in that one or more speed controlled bushes or sleeves are interposed between the surface of the rotating shaft and the stationary bearing surface.

In drawings which illustrate embodiments of the invention:

Figure 1 is a side elevation of a bearing with three interposed bushes for rotating shafts partly in section;

Figure 2 is a part sectional elevation of Figure 1 taken on the line 2—2 of that figure and looking in the direction of the arrow;

Figure 3 is a part sectional elevation of Figure 1 taken on the line 3—3 of that figure and looking in the direction of the arrow;

Figure 4 is a detail view of one of the inner shoes;

Figure 5 is a detail view of one of the outer shoes;

Figure 6 is a fragmentary view showing means by which the movement of the shoes can be controlled.

As shown in Figure 1 the shaft $a$ has three bushes or liners $b$, $b^1$, $b^2$ interposed between it and the stationary surface $c$ that may be part of any bearing or plummer block.

The right-hand end of the bush $b$ is provided with a recess in which are disposed two semicircular shoes $d$ each of which is mounted e. g. by means of rivets $e^1$ on one end of a thin flat spring $e$ of circular shape that is attached at its other end e. g. by means of a gib $e^2$ fitting in a slot $e^3$ to the bush $b$.

The left-hand end of the bush $b$ is provided with a flange $f$ embraced by two semicircular shoes $g$ each of which is mounted on one end of a thin flat spring $h$ of circular shape e. g. by means of rivets $h^1$ that is attached at its other end e. g. by means of screws $h^2$ to the periphery of the flange $f$.

The shape of the springs $e$ is such that the shoes $d$ are lightly pressed against the shaft $a$ when the shaft $a$ is stationary and the shape of the springs $h$ is such that the shoes $g$ are lightly pressed against the periphery of the flange $f$ when the bush $b$ is stationary.

The bushes $b^1$ and $b^2$ are arranged somewhat similarly to the bush $b$, but in order that the shoes $d^1$ of the bush $b^1$ and the shoes $d^2$ of the bush $b^2$ shall be in proper relation to the surface of the shaft $a$ the bushes $b^1$ and $b^2$ are provided with flanges on the left-hand ends and in order that the surfaces of the shoes $g$, $g^1$ and $g^2$ shall all have the same relation to the surface $c$ the bush $b^1$ has a small flange $f^1$ at the left-hand end and the bush $b^2$ has a recess at its left-hand end within which is disposed the shoes $g^2$.

The stationary surface $c$ is formed in the main casting of the machine or in the body of the plummer block and has end plates $i$ bolted or screwed thereto so as to retain the bushes $b$, $b^1$ and $b^2$ in proper relation to one another and to the stationary surface $c$.

It will be obvious that the relative dimensions of the various parts depend upon the requirements in each case and the following details must be regarded as by way of example only.

If the shaft $a$ is one and a half inches in diameter and is rotating at a speed of about two thousand eight hundred revolutions per minute it will have a surface speed of about one thousand and fifty feet per minute.

If the bush $b$ is tuned to rotate at about one thousand seven hundred and thirty revolutions per minute and is five sixteenths of an inch thick the peripheral speed of the external surface will be about nine hundred and sixty-one feet per minute whilst the peripheral speed of the internal surface will be about six hundred and fifty feet per minute thus showing a difference in speed with the shaft of about four hundred feet per minute i. e. 1050–650.

If the bush $b^1$ is tuned to rotate at about one thousand and ten revolutions per minute and is five sixteenths of an inch thick the peripheral speed of the external surface will be about seven hundred and twenty-six feet per minute whilst the peripheral speed of the internal surface will be about five hundred and sixty-one feet per minute thus showing a difference in speed with the external surface of the bush $b$ of about four hundred feet per minute i. e. 961–561.

If the sleeve $b^2$ is tuned to rotate at about four hundred and fifty-three revolutions per minute and is five sixteenths of an inch thick then the peripheral speed of the external surface will be about four hundred feet per minute and the peripheral speed of the internal surface will be about three hundred and twenty-six feet per minute thus showing a difference in speed with the external surface of the bush $b^1$ of about four hundred feet per minute i. e. 726–326.

From what has been said above it will be seen that the peripheral speed of the external surface of the sleeve $b^2$ relatively to the stationary surface $c$; the peripheral speed of the surface of the shaft $a$ relatively to the peripheral speed of the internal surface of the bush $b$; the peripheral speed of the external surface of the bush $b$ relatively to the peripheral speed of the internal surface of the bush $b^1$ and the peripheral speed of the external surface of the bush $b^1$ relatively to the peripheral speed of the internal surface of the bush $b^2$ is four hundred feet per minute so that although the shaft $a$ is rotating at two thousand eight hundred revolutions per minute the sliding friction is that of surfaces travelling only at four hundred feet per minute.

In the arrangement shown in the drawings three centrifugally controlled bushes have been interposed between the surface of the shaft and the stationary surface but obviously only one or more than three of such bushes may be used.

Each of the shoes $d$, $d^1$, $d^2$, $g$, $g^1$ and $g^2$ is mounted on one end of a spring blade that is fixed at the other end to constitute what in effect is an elastic cantilever and is therefore responsive to the effect of centrifugal force but whereas the shoes $d$, $d^1$ and $d^2$ tend to move away from the surface of the shaft $a$ by virtue of their speed of rotation, the shoes $g$, $g^1$ and $g^2$ tend to move into contact with the stationary surface $c$ by virtue of their speed of rotation and this difference in performance between the shoes $d$, $d^1$ and $d^2$ in contact with the shaft and the shoes $g^1$ and $g^2$ adjacent to the surface $c$ enables each sleeve $b$, $b^1$ or $b^2$ to be tuned to rotate at a definite speed.

The shoes $d$, $d^1$ and $d^2$ tend to transmit motion from the shaft to the bushes $b$, $b^1$ and $b^2$ respectively whilst the shoes $g$, $g^1$ and $g^2$ tend to check the rotation of the bushes $b$, $b^1$ and $b^2$ by virtue of contact with the stationary surface $c$ thus if the springs $e$ and springs $h$ are correctly gauged, each bush will tend to rotate steadily at its predetermined velocity when the shaft $a$ is running normally.

In the example given above the springs $e$ are so gauged that the shoes $d$ cease to transmit motion to the bush $b$ when rotating at a speed of about one thousand seven hundred and thirty revolutions per minute and if for any reason the speed of rotation of the bush $b$ exceeds one thousand seven hundred and thirty revolutions per minute then the rotation is checked by the shoes $g$.

In operation all the shoes $d$, $d^1$, $d^2$, $g$, $g^1$ and $g^2$ co-operate lightly with their complementary surfaces either directly or through a film of lubricant when the bushes $b$, $b^1$ and $b^2$ and the shaft $a$ are rotating at the prescribed speeds and the shoes should continue in a state of balance if the speed of the shaft $a$ is maintained but if the speed of any bush falls below that prescribed then the pressure of its urging shoes against the driving surface is increased and if the speed of any bush exceeds that prescribed then the pressure of its checking shoes against the more slowly moving or stationary surface is increased.

As shown in the drawings and described above the bushes $b$, $b^1$ and $b^2$ each are urged to rotate by the shoes $d$, $d^1$ and $d^2$ co-operating with the surface of the shaft $a$ and their rotation is checked respectively by the shoes $g$, $g^1$ and $g^2$ co-operating with the stationary surface $c$, but it is possible to arrange for the urging shoes on a bush to co-operate with the external surface of the next smaller bush and the checking shoes of that bush to co-operate with the internal surface of the enclosing bush, the urging shoes of the innermost bush co-operating with the shaft whilst the checking shoes of the outermost bush co-operate with the stationary surface.

The previous example also applies equally in this case because each bush is tuned to rotate at a definite speed so that theoretically it is quite unimportant how it is urged or how it is checked, however as a matter of regularity of performance generally the best results are obtained when all the bushes are urged by the shaft and checked by the stationary surface.

Practice shows that the necessary urging and checking requires only an infinitesimal amount of power, indeed the drag due to the use of a viscous lubricant may in some cases be excessive and to avoid this difficulty the inner surface of the shoes $d$, $d^1$ and $d^2$ and the outer surface of the shoes $g$, $g^1$ and $g^2$ may be knurled or patterned to break up the film of the lubricant and reduce the "drag" to the required minimum; for the same reason adequate clearance to give an easy running fit between the surfaces in rubbing contact, that may be proportional to the diameter thereof, is essential.

The flat springs such as $e$ and $h$ may be attached to the shoes such as $d$ and $g$ respectively in any possible way or each spring may be made in one piece with its shoe and the free ends of the springs such as $e$ and $h$ may be anchored to the bush such as $b$ by rivets, screws, spot welding or by having the end turned to form a gib suitable for location in a slot in which it may be retained by a fid.

The tuning of the springs $e$ and $h$ can be accomplished by carefully selecting the width and thickness of the strip used, by testing the strip to see that the metal has the required Young's modulus of elasticity and by "setting" the strip very precisely to a standard curve but generally it is preferred to relax the stringency of the above precautions somewhat and provide an adjustable auxiliary spring on each shoe.

As shown in Figure 6 the shoe $g^3$ (shown somewhat shorter than the shoes $g$, $g^1$ and $g^2$) is mounted on the flange $f$ by means of the spring $h$, the rivets $h^1$ and screws $h^2$ and has an auxiliary blade spring $k$ attached thereto intermediate of its ends by rivets $k^1$, the flange $f$ being recessed at $k^2$ and provided with a tapped hole $l$ for a tightly fitting "Allen" or other screw $m$ the head $n$ of which acts as an abutment to flex the spring $k$ in use, more or less, according to its position.

Although Figure 6 shows the application of the tuning means to shoes $g^3$ such means can be applied equally well to any of the shoes $g^1$, $g^2$, $d$, $d^1$ and $d^2$, or $g$.

The addition of auxiliary blade springs such as $k$ introduces means by which each shoe can be most delicately poised because it is floatingly supported by two springs in opposition.

For simplicity of description each of the centrifugally responsive shoes has been described as being mounted on or attached to the end of an elastic cantilever because this is extremely efficient and compact but it will be understood that such shoe may be hinged to operate against a spring or may be an elastic cantilever as a whole or may be a spring restrained plunger with or without dashpot control and further that any number of shoes may be associated with a bush but to avoid lack of balance usually there are two or more "urging" shoes and two or more "checking" shoes but in very light load mechanism it is possible to obtain the desired result with only one urging shoe or one checking shoe on each bush.

Further, if necessary, each bush may be divided longitudinally into two parts so that the bushes can be assembled on a shaft and in a plummer block without disturbing pulleys or flanges on the shaft, the half bushes being registered in position and secured together as may be necessary by dowels and/or joggles.

I claim:

1. Speed controlling mechanism for controlling the rotational speed of a bush which is interposed between the rotating surface of a shaft and the internal bearing surface of a stationary housing, which comprises: a first elastic metal strip, one end of which is mounted on said bush; a first shoe mounted on the free end of said first metal strip so as to rest on said rotating shaft when stationary; a second elastic metal strip, one end of which is mounted on said bush; and a second shoe mounted on the free end of said second metal strip, said second shoe being positioned so that it is rotated by said bush in proximity to said internal bearing surface of said stationary housing.

2. Speed controlling mechanism for controlling the rotational speed of a bush which is interposed between the rotating surface of a shaft and the internal bearing surface of a stationary housing, which comprises: a first flat circularly-curved spring, one end of which is mounted on said bush; a first circularly-curved shoe mounted on said first spring intermediate the ends thereof, said shoe being positioned so as to rest on the surface of said rotating shaft when stationary; an adjustable stop engaging the free end of said first spring, said stop acting to reduce the tendency of said shoe to leave the surface of said shaft when rotating; a second flat circularly-curved spring, one end of said second spring being mounted on said bush; a second circularly-curved shoe mounted on said second spring intermediate the ends thereof, said shoe being positioned so as to be rotated by said bush in proximity to said internal bearing surface of said stationary housing when said bush is rotating; and an adjustable stop engaging the free end of said second spring to reduce the tendency of said second curved shoe to contact said internal bearing surface of said stationary housing.

3. Speed controling mechanism for controlling the rotational speed of a bush which is interposed between the rotating surface of a shaft and the internal bearing surface of a stationary housing, which comprises: a first set of equally-spaced flat circularly-curved springs, one end of each spring being mounted on said bush; a curved shoe mounted on each spring intermediate the ends thereof, said shoes being positioned so as to rest on the surface of said shaft when stationary; adjustable stops respectively engaging the free ends of said springs to reduce the tendency of said cudved shoes to leave the surface of said shaft when rotating; a second set of equally-spaced flat circularly-curved springs, one end of which is mounted on said bush; a curved shoe mounted on each spring of said second set intermediate the ends thereof, said shoes being positioned so as to be rotated by said bush in proximity to said internal bearing surace of said stationary housing when said bush is rotated; and adjustable stops respectively engaging the free ends of said springs of said second set to reduce the tendency of said second curved shoes to contact with said internal bearing surface of said stationary housing.

4. Speed controlling mechanism for controlling the rotational speed of a plurality of concentric bushes interposed between the rotating surface of a shaft and the internal bearing surface of a stationary housing, which comprises: first elastic metal strips, one end of each strip being mounted on a bush; first shoes each of which is mounted respectively on the free end of each strip, and so positioned as to rest on said shaft when stationary; second elastic metal strips, one end of each of which is mounted on a bush; and second shoes, each of which is mounted respectively on the free end of each second strip, and so positioned as to be rotated by its bush in proximity to said internal bearing surface of said stationary housing.

5. Speed controlling mechanism for controlling the speed of rotation of concentric bushes interposed between the rotating surface of a shaft and the internal bearing surface of a stationary housing, which comprises: first flat circularly-curved springs, one end of each of which is mounted on a bush; a circularly-curved shoe mounted on each spring intermediate the ends thereof and so positioned as to rest on the surface of said shaft when stationary; an adjustable stop engaging the free end of each spring to reduce the tendency of the shoe to leave the surface of said shaft when rotating; second flat circularly-curved springs, one end of each of which is mounted on a bush; a circularly-curved shoe mounted on each second spring intermediate its ends and positioned so as to be rotated by said bush in proximity to said internal bearing surface of said stationary housing when said bush is rotating; and an adjustable stop engaging the free end of each second spring to reduce the tendency of said curved shoe on said second spring to contact with said internal bearing surface on said stationary housing.

6. Speed controlling mechanism for controlling the speed of rotation of concentric bushes interposed between the rotating surface of a shaft and the internal bearing surface of a stationary housing, which comprises: a set of equally-spaced flat circularly-curved springs mounted on each bush; a circularly-curved shoe mounted on each spring intermediate the ends thereof and positioned so as to rest on the surface of said shaft when stationary; an adjustable stop engaging the free end of each spring to reduce the tendency of said shoe to leave the surface of said shaft when rotating; a second set of equally-spaced flat circularly-curved springs mounted on each bush; a circularly-curved shoe mounted on each spring intermediate its ends and positioned so as to be rotated by said bush in proximity to said internal bearing surface of said stationary housing when said bush is rotating; and an adjustable stop engaging the free end of each of said second set of springs to reduce the tendency of the shoes mounted on said springs to contact with said internal bearing surface of said stationary housing.

ARTHUR RONALD TRIST.

REFERENCES CITED

The following references are of record in the file of this patent:

UNITED STATES PATENTS

| Number | Name | Date |
|---|---|---|
| 229,171 | Osenbruck | June 22, 1880 |
| 1,229,414 | Clark | June 21, 1917 |
| 1,313,466 | Buxton | Aug. 19, 1919 |
| 1,402,794 | Reese | Jan. 10, 1922 |
| 1,459,454 | Trotter | June 19, 1923 |
| 2,539,287 | Trist | Jan. 23, 1951 |